United States Patent
Patel et al.

(10) Patent No.: US 12,108,013 B2
(45) Date of Patent: Oct. 1, 2024

(54) METHOD AND PROCESSING UNIT FOR CONTROLLING VIEWPOINT OF ATTENDEES IN AN IMMERSIVE ENVIRONMENT

(71) Applicant: ZEALITY INC., Pleasanton, CA (US)

(72) Inventors: Dipak Mahendra Patel, Pleasanton, CA (US); Anmol Agarwal, Lucknow (IN)

(73) Assignee: Zeality Inc, Pleasanton, CA (US)

( * ) Notice: Subject to any disclaimer, the term of this patent is extended or adjusted under 35 U.S.C. 154(b) by 395 days.

(21) Appl. No.: 17/874,343

(22) Filed: Jul. 27, 2022

(65) Prior Publication Data

US 2024/0040097 A1 Feb. 1, 2024

(51) Int. Cl.
*H04N 13/117* (2018.01)
*G06F 3/01* (2006.01)
*G06F 3/04815* (2022.01)

(52) U.S. Cl.
CPC ........... *H04N 13/117* (2018.05); *G06F 3/011* (2013.01); *G06F 3/04815* (2013.01)

(58) Field of Classification Search
CPC .... H04N 13/117; G06F 3/011; G06F 3/04815
See application file for complete search history.

(56) References Cited

U.S. PATENT DOCUMENTS

| 6,288,739 | B1 | 9/2001 | Hales et al. |
| 8,548,232 | B2 | 10/2013 | Yamada |
| 10,112,111 | B2 | 10/2018 | Marks et al. |
| 11,295,511 | B1* | 4/2022 | Yosifov ................. G06T 11/206 |
| 2016/0378178 | A1* | 12/2016 | Wei ......................... G06F 3/012 |
| | | | 345/156 |
| 2017/0365102 | A1* | 12/2017 | Huston ................... A63F 13/65 |

FOREIGN PATENT DOCUMENTS

| KR | 102112074 B1 | 2/2020 |
| KR | 20200025241 A | 3/2020 |
| KR | 102114703 | 5/2020 |

* cited by examiner

*Primary Examiner* — Sing-Wai Wu
(74) *Attorney, Agent, or Firm* — Riyon Rae Harding

(57) ABSTRACT

A method, a processing unit, and a non-transitory computer-readable medium for controlling viewpoint of attendees in immersive environment are disclosed. For controlling viewpoint, initially, presenter input is received. Presenter input indicates objects selected amongst plurality of objects displayed in 360° view of a content in immersive environment. Further, the objects to be displayed are dynamically fixed within viewpoint across the 360° view of the attendees. The objects are dynamically fixed within viewpoint irrespective of inputs received from the attendees to change objects within viewpoint. New objects, amongst the plurality of objects are detected based on at least one of real-time preferences of the attendees and real-time context of the content provided by the presenter. Upon detecting the new objects, the objects are dynamically re-fixed within the viewpoint of the attendees.

17 Claims, 11 Drawing Sheets

METHOD AND PROCESSING UNIT FOR CONTROLLING VIEWPOINT OF ATTENDEES IN AN IMMERSIVE ENVIRONMENT

FIELD OF THE PRESENT INVENTION

Embodiments of the present invention generally relate to controlling display of attendees in an immersive environment. In particular, embodiments of the present invention relate to a method and processing unit for controlling viewpoint of the attendees in the immersive environment based on real-time inputs.

BACKGROUND OF THE DISCLOSURE

A 360° view is a view covering the complete surroundings of a user. The 360° view may be displayed to the user to provide an immersive environment like virtual reality, augmented reality, mixed reality and so on. Some examples of such immersive environments may be a virtual classroom, a virtual meeting, a virtual group discussion, an online presentation, an online gaming platform, a virtual tour, or live streaming of a game and so on. In the immersive environment with at least one presenter and one or more attendees, a presenter may want to control content or media to be presented to the one or more attendees. The content or the media may be displayed as the 360° view for each of the one or more attendees and the presenter. The content may include any, or a combination of video data, audio data, image data, textual data, graphical data, and so on. Such content may be rendered to the one or more attendees via a transmission medium such as the Internet or local wireless connection. The presenter and the one or more attendees may connect with the immersive environment via user devices. The user devices may be a Head Mounted Device (HMD), a smartphone, a smart glass, a television, a PC, a tablet, a laptop, and so on.

The content displayed on the 360° view may include a plurality of objects. The presenter may be speaking about one or more objects amongst the plurality of objects. It is required by the one or more attendees to pay attention to the one or more objects about which the presenter is speaking. However, with the 360° view, it is highly possible for attendees to get distracted by objects other than the one or more objects that the presenter may be speaking about. Especially, in a virtual classroom, it may be challenging for the presenter, for example, a lecturer or teacher to make sure students are paying attention to the object about which the lecturer or teacher is speaking.

In some instances, with the 360° view, it is possible that the one or more attendees may not be viewing the object about which the lecturer is speaking. It is not easy for the lecturer to verbally grab the attention of the students towards the object. Some conventional techniques teach to modify the display to make certain objects always display within the viewpoint or field of view of the user. However, fixing the objects on the display may not be as per the inputs of the presenter. Thus, relevant objects, as per content rendered to attendees, may be missed to be fixed on the display. Also, in some cases, it may be required that the objects which are fixed within the field of view of the user need to be dynamically changed throughout the rendering of the content in the immersive environment.

Therefore, there is a need for a method and processing unit which provisions to receive input from the presenter on an object which is to be fixed within the viewpoint of the presenter and further new objects are fixed dynamically based on real-time data.

The information disclosed in this background of the disclosure section is only for enhancement of understanding of the general background of the disclosure and should not be taken as an acknowledgement or any form of suggestion that this information forms existing information already known to a person skilled in the art.

BRIEF SUMMARY OF THE DISCLOSURE

A method, a processing unit, and a non-transitory computer-readable medium for controlling viewpoint of one or more attendees in an immersive environment are disclosed. For controlling the viewpoint, initially, presenter input is received. The presenter input indicates one or more objects selected amongst a plurality of objects displayed in 360° view of a content in an immersive environment comprising a presenter and one or more attendees. Further, the one or more objects to be displayed are dynamically fixed within viewpoint across the 360° view of the one or more attendees based on the presenter input. The one or more objects are dynamically fixed within the viewpoint of the one or more attendees irrespective of inputs received from the one or more attendees to change objects within their respective viewpoint. The one or more new objects, amongst the plurality of objects, to be fixed within the viewpoint of the one or more attendees are detected based on at least one of real-time preferences of the one or more attendees and real-time context of the content being presented by the presenter. Upon detecting the one or more new objects, the one or more new objects are dynamically re-fixed within the viewpoint of the one or more attendees.

In a non-limiting embodiment, the one or more new objects are detected by monitoring user actions of the one or more attendees during rendering of the content in the immersive environment. Upon monitoring, the real-time preference of the one or more attendees with respect to objects displayed in the 360° view is identified using the user actions. Further, the one or more new objects are detected using the real-time preferences of the one or more attendees.

In a non-limiting embodiment, the user actions comprise at least one of eyeball movement, head movement, gesture, display controller input, voice input and screen input of the one or more attendees.

In a non-limiting embodiment, wherein detecting the one or more new objects comprises identifying the real-time context of the content provided by the presenter by analyzing the content. Further, the one or more new objects are detected using the real-time context.

In a non-limiting embodiment, dynamically re-fixing the one or more new objects to be displayed within the viewpoint comprises providing a recommendation generated based on at least one of the real-time preferences and the real-time context, to the presenter for modifying the one or more selected objects to be the one or more new objects. Further, the presenter input indicating the one or more new objects selected by the presenter in response to the recommendation is received. The one or more new objects to be displayed within the viewpoint are dynamically re-fixed based on the input.

In a non-limiting embodiment, each of the one or more objects and the one or more new objects are one of static objects and dynamic objects.

In a non-limiting embodiment, dynamically fixing the one or more objects and dynamically re-fixing the one or more new objects comprises one of continuously rendering one of the one or more objects and the one or more new objects within the viewpoint and adjusting the display of the 360° view to fixedly present one of the one or more objects and the one or more new objects within the viewpoint.

The features and advantages of the subject matter hereof will become more apparent in light of the following detailed description of selected embodiments, as illustrated in the accompanying FIGUREs. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
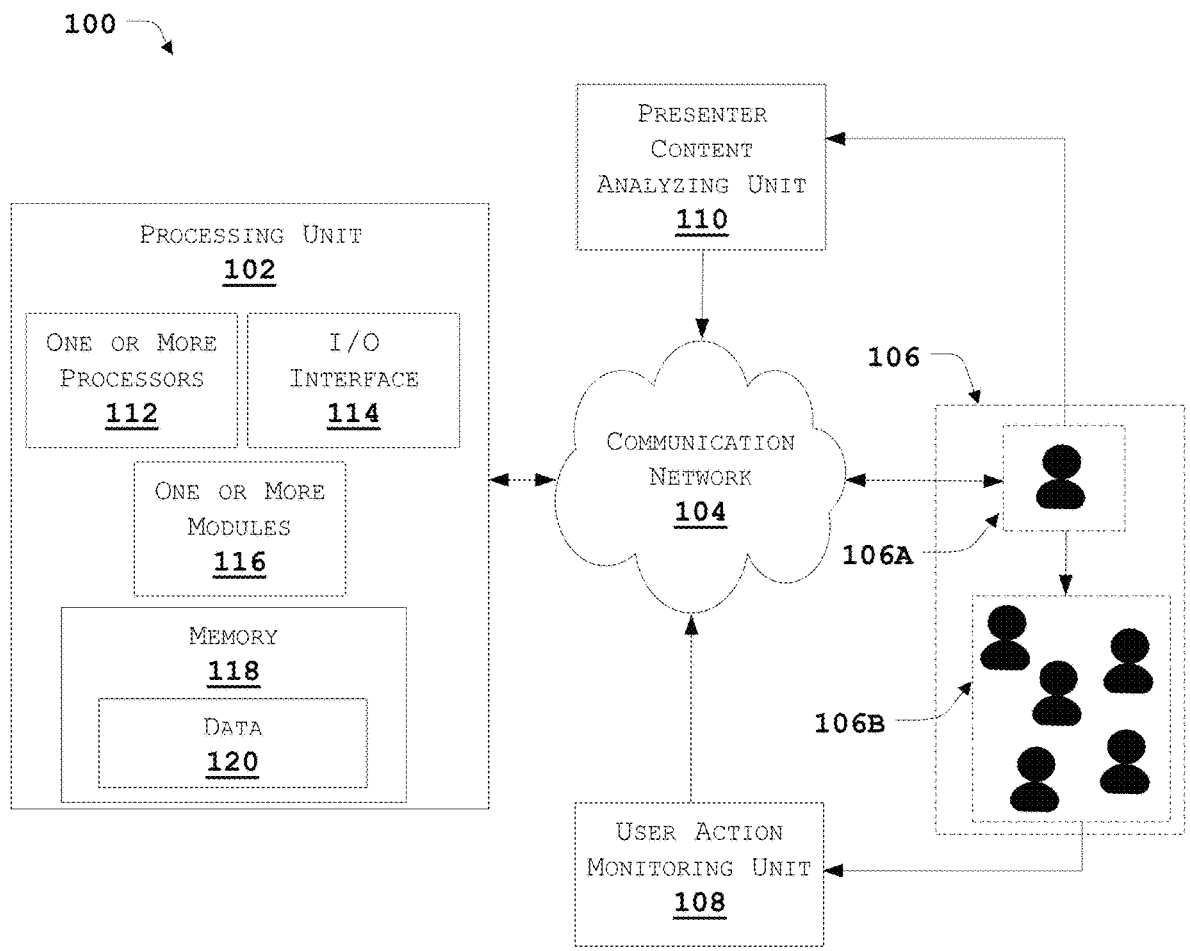
FIG. 1 illustrates an exemplary environment with a processing unit for controlling viewpoint of one or more attendees in an immersive environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, system, a non-transitory computer-readable medium, and a processing unit for controlling viewpoint of one or more attendees in an immersive environment. Presenter input indicating objects to be viewed by attendees is received from presenter. The objects selected are dynamically fixed within viewpoint of the attendees based on the presenter's input and other real-time inputs. Further, the present invention teaches to dynamically updates the objects with new objects based on real-time data such as real-time preferences of the attendees and real-time context of content provided by the presenter.

FIG. 1 illustrates an exemplary environment 100 with processing unit 102 for controlling viewpoint of one or more attendees in an immersive environment, in accordance with an embodiment of the present invention. As shown in FIG. 1, the exemplary environment 100 comprises the processing unit 102, a communication network 104, a plurality of users 106, a user action monitoring unit 108 and a presenter content analyzing unit 110. The exemplary environment 100 may be the immersive environment to which the plurality of users 106 are connected. In an embodiment, the immersive environment may be any environment that renders content to the plurality of users 106. The content may include, but is not limited to, at least one of video data, audio data, images data, text data, graphics data, and so on. The immersive environment may be, but is not limited to, an extended reality environment/immersive environment, a live-telecast environment, a content streaming environment, a visual communication environment, an online gaming environment, and so on. The plurality of users 106 may include a presenter 106A and one or more attendees 106B. The immersive environment may be an environment where the presenter 106A and the one or more attendees 106B are connected to receive the content. Usually, the presenter 106A may be presenting the content to the one or more attendees 106B in such an environment. Alternatively, the presenter 106A and the one or more attendees 106B amongst the plurality of users 106 may not be pre-defined. Based on access provided by the content rendering environment and the requirements, any user, amongst the plurality of users 106, may be the presenter 106A and others may be the one or more attendees 106B, at any instant of time during rendering of the content. In an embodiment, the immersive environment may be a real-time communication session established amongst the plurality of users 106. The content may be, but is not limited to, real-time dynamically generated data, replayed data, pre-defined data, pre-stored data, live telecast data, and so on, that may be presented to the one or more attendees 106B by the presenter 106A. In an embodiment, the plurality of users 106 may be connected to the immersive environment via user devices. The user devices may be, but are not limited to, at least one of a smartphone, a head-mounted device, smart glasses, a television, a PC, a tablet, a laptop, and so on. In an embodiment, each of the plurality of users 106 may be associated with a dedicated user device. In an alternate embodiment, the at least one presenter 106A may be associated with a dedicated user device, and the one or more attendees 106B may be associated with one or more user devices.

The proposed processing unit 102 and method may be implemented in such an environment that renders the content to the plurality of users 106 including the at least one presenter 106A and the one or more attendees 106B. The content may be rendered to the user devices of the plurality of users 106. The processing unit 102 may be configured to control viewpoint of the one or more attendees. In an embodiment, the processing unit 102 may be communicatively coupled with the user devices of the plurality of users 106. In an embodiment, the processing unit 102 may be implemented as a cloud-based server that is configured to communicate with each of the user devices, for controlling the viewpoint. In an alternate embodiment, the processing unit 102 may be part of a user device associated with the at least one presenter 106A (not shown in the Figure). In such embodiment, the processing unit 102 may be configured to communicate with the user devices of the one or more attendees 106B and may be configured to control the viewpoint.

In an embodiment, for controlling the viewpoint, the processing unit 102 may be configured to function in real-time, when the at least one presenter 106A is presenting the content to the one or more attendees 106B. During presenting of the content by the at least one presenter 106A, the one or more objects and the one or more new objects may be detected and the viewpoint of the one or more attendees may be controlled to fixedly present one of the one or more objects and the one or more new objects. The processing unit 102 may be in communication with the user device associated with the at least one presenter 106A and the one or more attendees 106B, to control the viewpoint.

Further, the processing unit 102 may be in communication with each of the user action monitoring unit 108 and the presenter content analyzing unit 110. The user action monitoring unit 108 may be configured to monitor user actions of the one or more attendees. The presenter content analyzing unit 110 may be configured to analyze the content provided by the presenter in the immersive environment. The monitored user actions may be used to identify the real-time preferences of the one or more attendees. The presenter content may be analyzed to identify the real-time context. The processing unit 102 may detect the one or more new objects which are to be dynamically fixed within the viewpoint using the real-time preferences and the real-time context.

In an embodiment, the processing unit 102 may be connected with the user devices associated with the plurality of users 106, the user action monitoring unit 108 and the presenter content analyzing unit 110 via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user devices, the user action monitoring unit 108 and the presenter content analyzing unit 110 via a corresponding dedicated communication network (not shown in FIG.).

Figure 2:
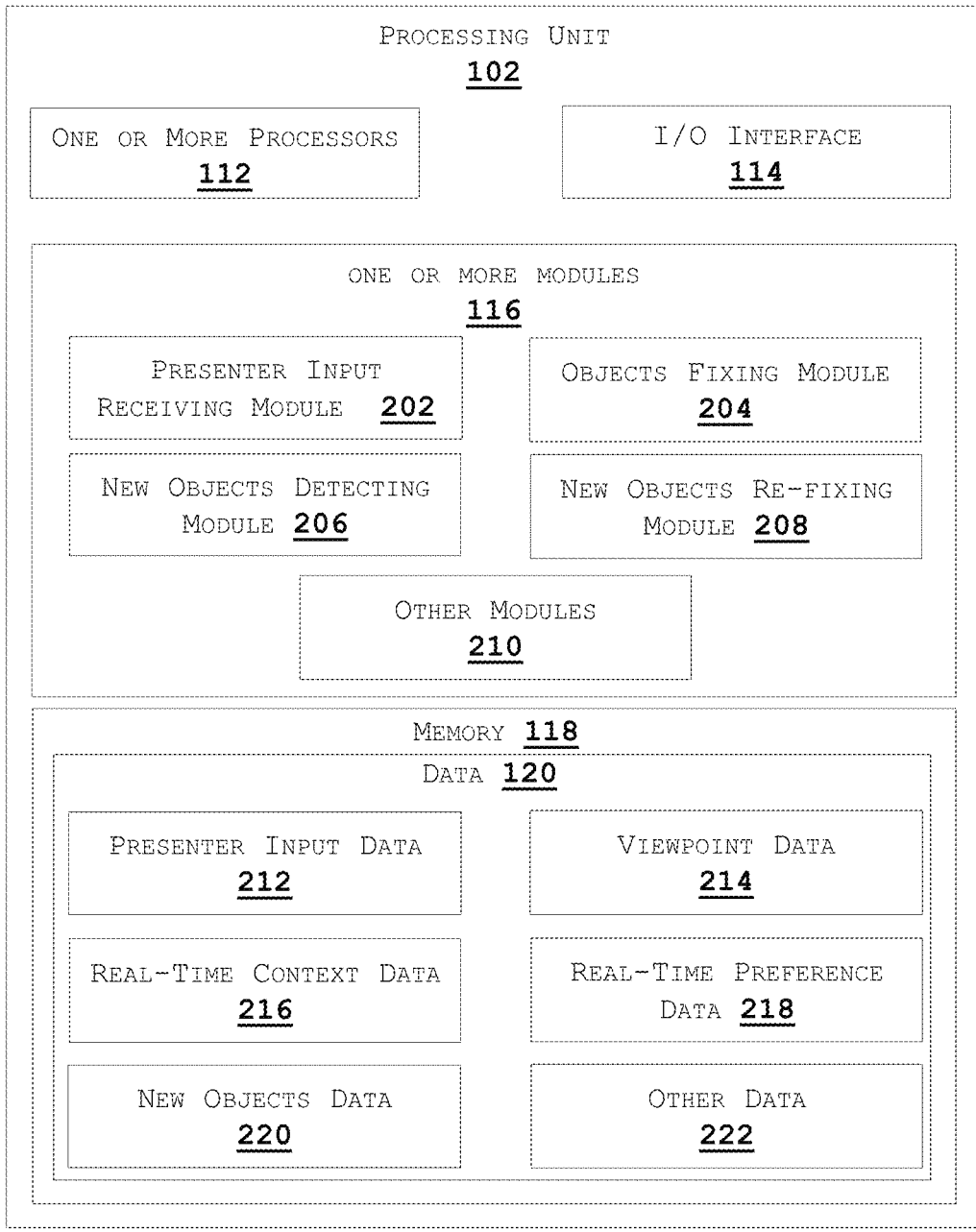
FIG. 2 illustrates a detailed block diagram showing functional modules of a processing unit for controlling viewpoint of one or more attendees in an immersive environment, in accordance with an embodiment of the present invention.

FIG. 2 shows a detailed block diagram of the processing unit 102 for controlling viewpoint of one or more attendees in an immersive environment, in accordance with some non-limiting embodiments or aspects of the present disclosure. The processing unit 102 may include one or more processors 112, an Input/Output (I/O) interface 114, one or more modules 116, and a memory 118. In some non-limiting embodiments or aspects, the memory 118 may be communicatively coupled to the one or more processors 112. The memory 118 stores instructions, executable by the one or more processors 112, which on execution, may cause the processing unit 102 to control the viewpoint of the one or more attendees. In some non-limiting embodiments or aspects, the memory 118 may include data 120. The one or more modules 116 may be configured to perform the steps of the present disclosure using the data 120 to control the viewpoint. In some non-limiting embodiments or aspects, each of the one or more modules 116 may be a hardware unit, which may be outside the memory 118 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 116 may be implemented with a cloud-based server, communicatively coupled with the processing unit 102.

The data 120 in the memory 118 and the one or more modules 116 of the processing unit 102 are described herein in detail. In one implementation, the one or more modules 116 may include, but is not limited to, a presenter input receiving module 202, an objects fixing module 204, a new objects detecting module 206, a new objects re-fixing module 208, and one or more other modules 210 associated with the processing unit 102. In some non-limiting embodiments or aspects, the data 120 in the memory 118 may include presenter input data 212 (herewith also referred to as presenter input 212), viewpoint data 214, real-time context data 216 (herewith also referred to as real-time context 216), real-time preference data 218 (herewith also referred to as real-time preference 218), new objects data 220 (herewith also referred to as one or more new objects 220), and other data 222 associated with the processing unit 102.

In some non-limiting embodiments or aspects, the data 120 in the memory 118 may be processed by the one or more modules 116 of the processing unit 102. In some non-limiting embodiments or aspects, the one or more modules 116 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 116 of the present disclosure control the access to the virtual and real-world environment. The one or more modules 116 along with the data 120, may be implemented in any system for controlling viewpoint of the one or more attendees in the immersive environment.

Initially, the presenter input receiving module 202 is configured to receive the presenter input 212 indicating the one or more objects selected amongst the plurality of objects displayed in 360° view of a content in an immersive environment. The presenter of the immersive environment may select the one or more objects. The presenter input 212 may be received via the user device associated with the presenter. In an embodiment, the 360° view displayed to the one or more attendees may be initially displayed to the presenter for obtaining the presenter input. In an embodiment, the presenter input may be received before the commencement of the presentation by the presenter. The presenter may select the one or more objects via a Graphical User Interface (GUI) of the user device. The presenter may manually select the one or more objects via the GUI. In an alternate embodiment, the presenter input may include data regarding the one or more objects which are to be displayed at various instances of the presentation. The presenter input may be pre-fed and retrieved during rendering of the content to the one or more attendees. For example, consider a scenario of a virtual classroom, with a teacher presenting a topic to students. The 360° view of the virtual classroom may include a plurality of objects including content related to the topic. For example, the plurality of objects viewed by one of the students may include other students, the ambience of a virtual classroom, the teacher, objects related to the topic and so on. In such a case, the teacher may be a presenter and may provide presenter input 212 by selecting objects related to the topic.

Figure 3A:
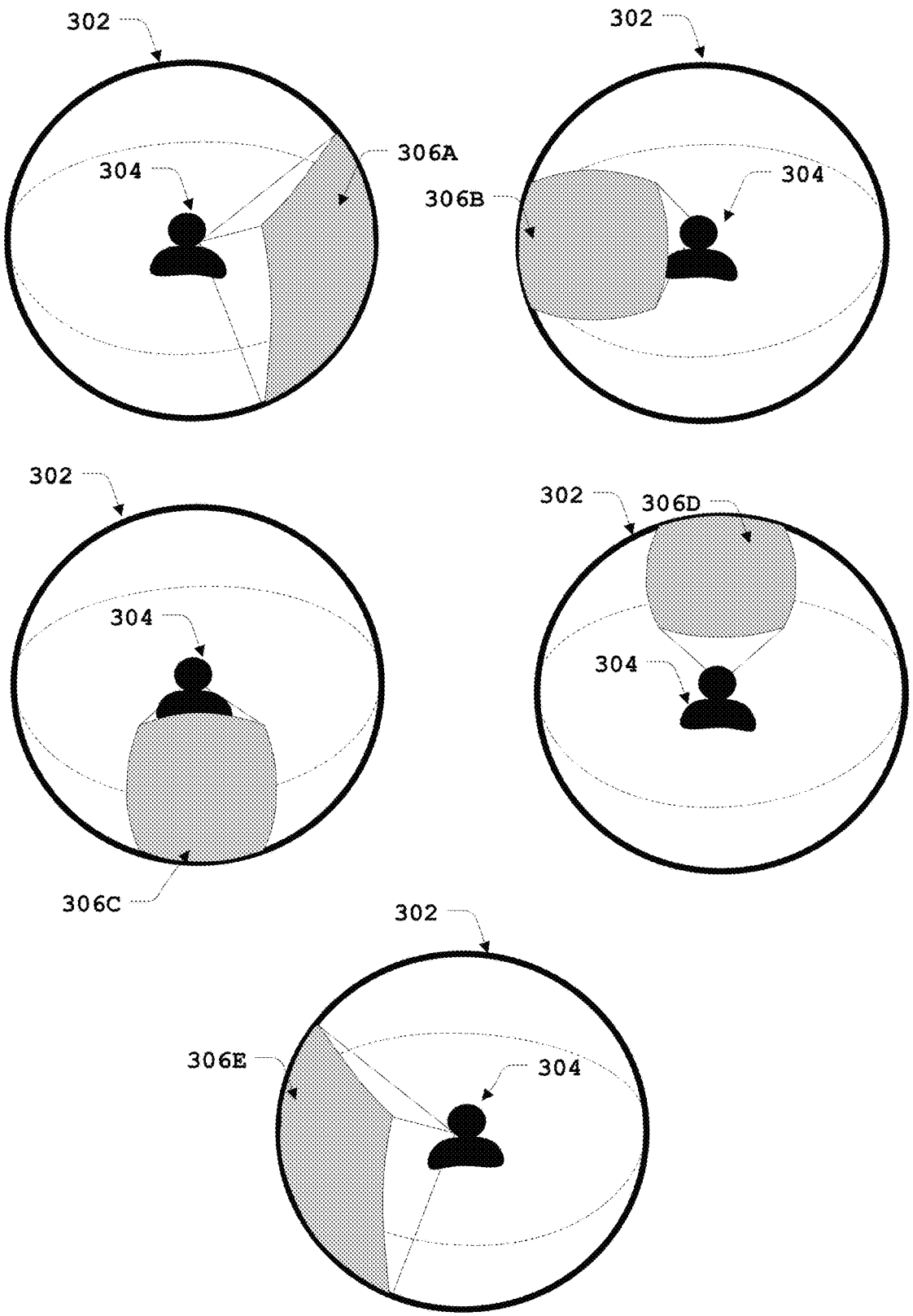
FIGS. 3A-3G show exemplary embodiments for controlling viewpoint of one or more attendees in an immersive environment, in accordance with an embodiment of the present invention.

Upon receiving the presenter input, the objects fixing module 204 may be configured to dynamically fix the one or more objects. The one or more objects are fixed to be displayed within viewpoint across the 360° view of the one or more attendees based on the presenter input 212. The viewpoint of an attendee from the one or more attendees may be defined as field of view of the attendee. Part of display of the 360° view at which the attendee is viewing may be referred to the viewpoint. Consider embodiment illustrated in FIG. 3A. The 360° view 302 of an attendee 304 is illustrated with various viewpoints 306A, 306B, 306C, 306D and 306E. The viewpoint may be identified based on one or more inputs from the attendee. The one or more inputs may include, but are not limited to, head rotation movement, eyeball movement, display controller input and so on. For example, when the attendee 304 turns towards rights side of the 360° view 302, viewpoint for the attendee may be defined to be the viewpoint 306A. In an embodiment, dimension and shape of the viewpoint may be pre-defined. An exemplary representation of the viewpoint is shown in FIG. 3A. In an immersive environment, each of the one or more attendees may be associated with a corresponding viewpoint at each instant of time. The objects fixing module 204 may be configured to detect the viewpoint of each of the one or more attendees at each instant of time during the presentation. The detected viewpoints of the one or more attendees may be stored as the viewpoint data 214 in the memory 118. Upon detecting the viewpoints, the objects fixing module 204 may be configured to dynamically fix the one or more objects at the detected viewpoints of the one or more attendees at every instant of time. In an embodiment, the one or more objects are dynamically fixed irrespective of inputs received from the one or more attendees to change objects within the viewpoint. For example, consider an attendee is viewing the one or objects selected by the presenter and eventually is trying to change the viewpoint to view another object in the 360° view. In such a scenario, rather than displaying another object, the objects fixing module 204 fixes the selected one or more objects within the new viewpoint of the attendee.

In an embodiment, for dynamically fixing the one or more objects within the viewpoint, the objects fixing module 204 may be configured to continuously render the one or more objects within the viewpoint. In another embodiment, the objects fixing module 204 may be configured to adjust display of the 360° view to fixedly present the one or more objects within the viewpoint. One or more other techniques, known to a person skilled in the art, may be implemented to dynamically fix the one or more objects.

During the presentation with fixedly displaying the one or more objects, the new objects detecting module 206 may be configured to detect the one or more new objects 220, amongst the plurality of objects, to be fixed within the viewpoint of the one or more attendees. The one or more new objects 220 may be detected based on at least one of the real-time preferences 218 of the one or more attendees and the real-time context 216 of the content provided by the presenter.

In an embodiment, the new objects detecting module 206 may be coupled with the user action monitoring unit 108 to identify the real-time preferences 218 and detect the one or more new objects 220. In an embodiment, the user action monitoring unit 108 may implement image processing techniques to monitor the user actions of the one or more attendees. The user action may be recorded as a video and the video may be analyzed using software tools to detect the user actions. In an embodiment, the user action monitoring unit 108 may implement one or more sensors to monitor the user actions of the one or more attendees. Output from the one or more sensors may be analyzed to monitor the user actions. The monitored user actions may be communicated with the new objects detecting module 206 to detect the one or more new objects 220. In an alternate embodiment, the user action monitoring unit 108 may be integral part of the new objects detecting module 206. In an embodiment, the user actions may include, but are limited to, at least one of eyeball movement, head movement, gesture, display controller input, voice input and screen input of the one or more attendees. In an embodiment, the one or more sensors may include, but are not limited to, one or more cameras, tilt sensors, accelerometers, touch sensors, microphone, eyeball movement detectors and so on. Upon detecting the user actions, the real-time preferences 218 of the one or more attendees with respect to objects displayed in the 360° view are identified using the user actions. In an embodiment, when a maximum number of the one or more attendees are trying to view an object other than the object selected by the presenter, such action may be identified to be the real-time preference 218 and such object may be detected to be the new object.

In an embodiment, the new objects detecting module 206 may be coupled with the presenter content analysis unit to identify real-time context 216 of the content provided by the presenter. In an embodiment, the content provided by the presenter may be the content spoken by the presenter, a topic of the content selected by the presenter and so on. In an embodiment, the content may be real-time content or pre-fed content. Using the real-time context 216, the new objects detecting module 206 may be configured to detect the one or more new objects 220. For example, consider initially selected object may be related to a Venn diagram and the Venn diagram may be fixed within the viewpoint of the one or more attendees. When rendering the content, consider the presenter deviates from explaining the Venn Diagram and started explaining a pie chart. In such a case, the real-time context 216 may be identified to be related to the pie chart and the new object may be the pie chart.

Upon detecting the one or more new objects 220, the new objects re-fixing module 208 may be configured to dynamically re-fix the one or more new objects 220 to be displayed within the viewpoint of the one or more attendees. In an embodiment, the one or more new objects 220 may be dynamically re-fixed within the viewpoint either by continuously rendering the one or more new objects 220 within the viewpoint or by adjusting display of the 360° view to fixedly present the one or more new objects 220 within the viewpoint. One or more other techniques, known to a person skilled in the art, may be implemented to dynamically re-fix the one or more new objects 220.

In an embodiment, upon detecting the one or more new objects 220, the new objects re-fixing module 208 may be configured to automatically re-fix the one or more new objects 220. In an alternate embodiment, upon detecting the one or more new objects 220, the new objects re-fixing module 208 may be configured to provide a recommendation generated based on at least one of the real-time preferences 218 and the real-time context 216, to the presenter for modifying the one or more selected objects to be the one or more new objects 220. When the presenter input 212 indicating the one or more new objects 220 selected by the presenter is received in response to the recommendation, the one or more new objects 220 to be displayed within the viewpoint are dynamically re-fixed based on the presenter input 212.

Figure 3B:
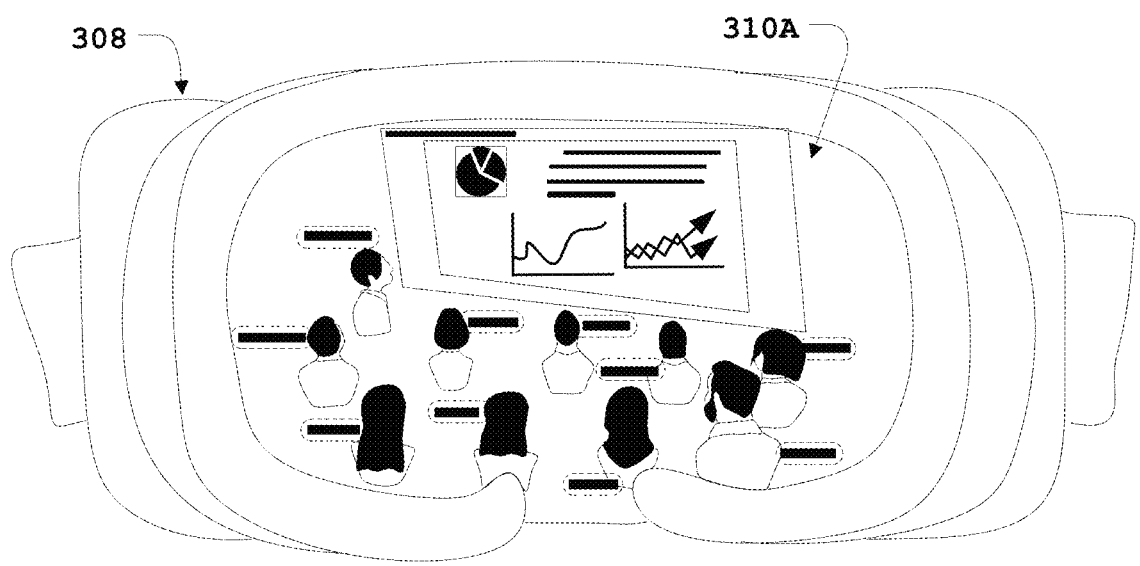
Figure 3C:
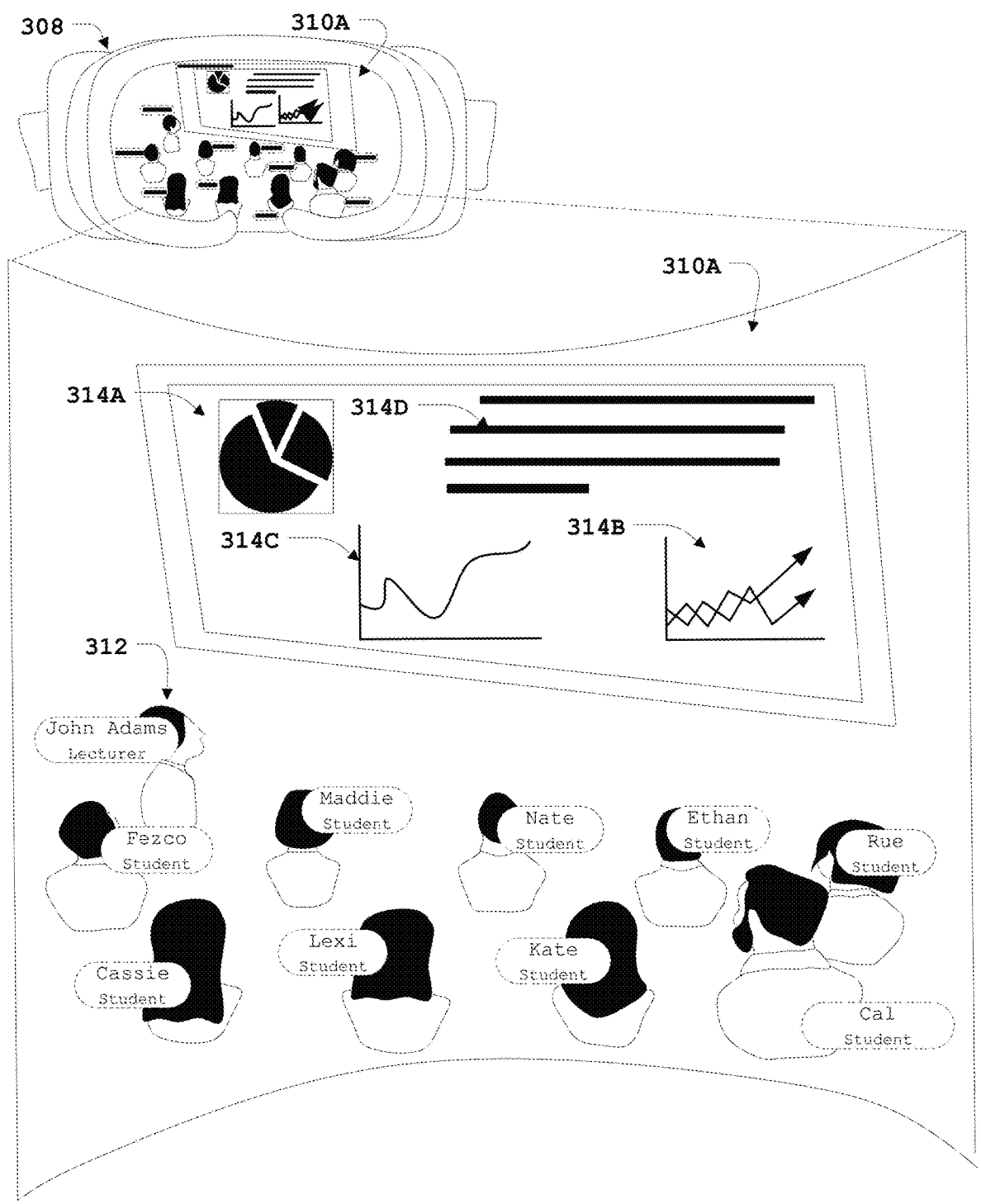
Figure 3D:
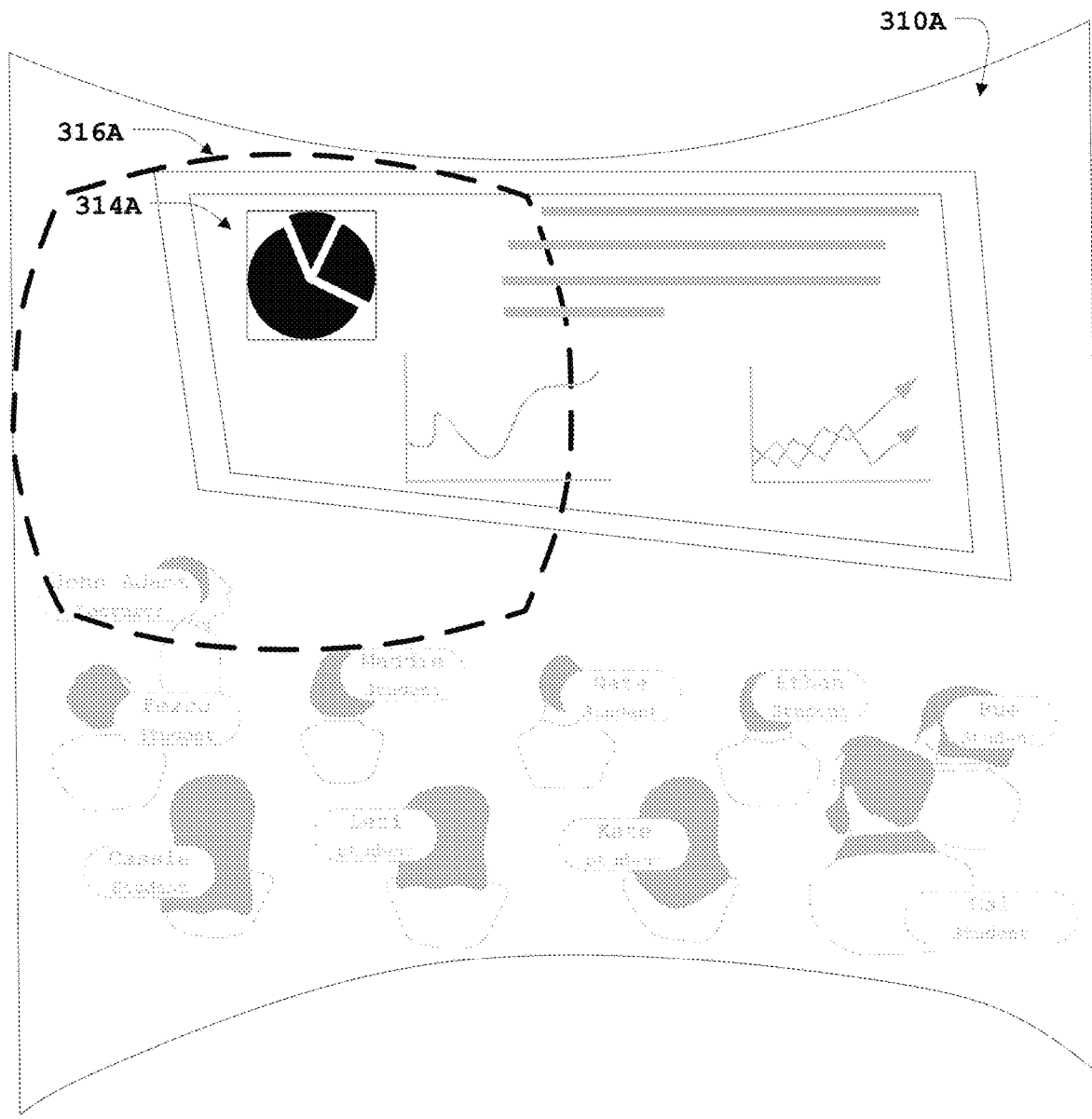
Figure 3E:
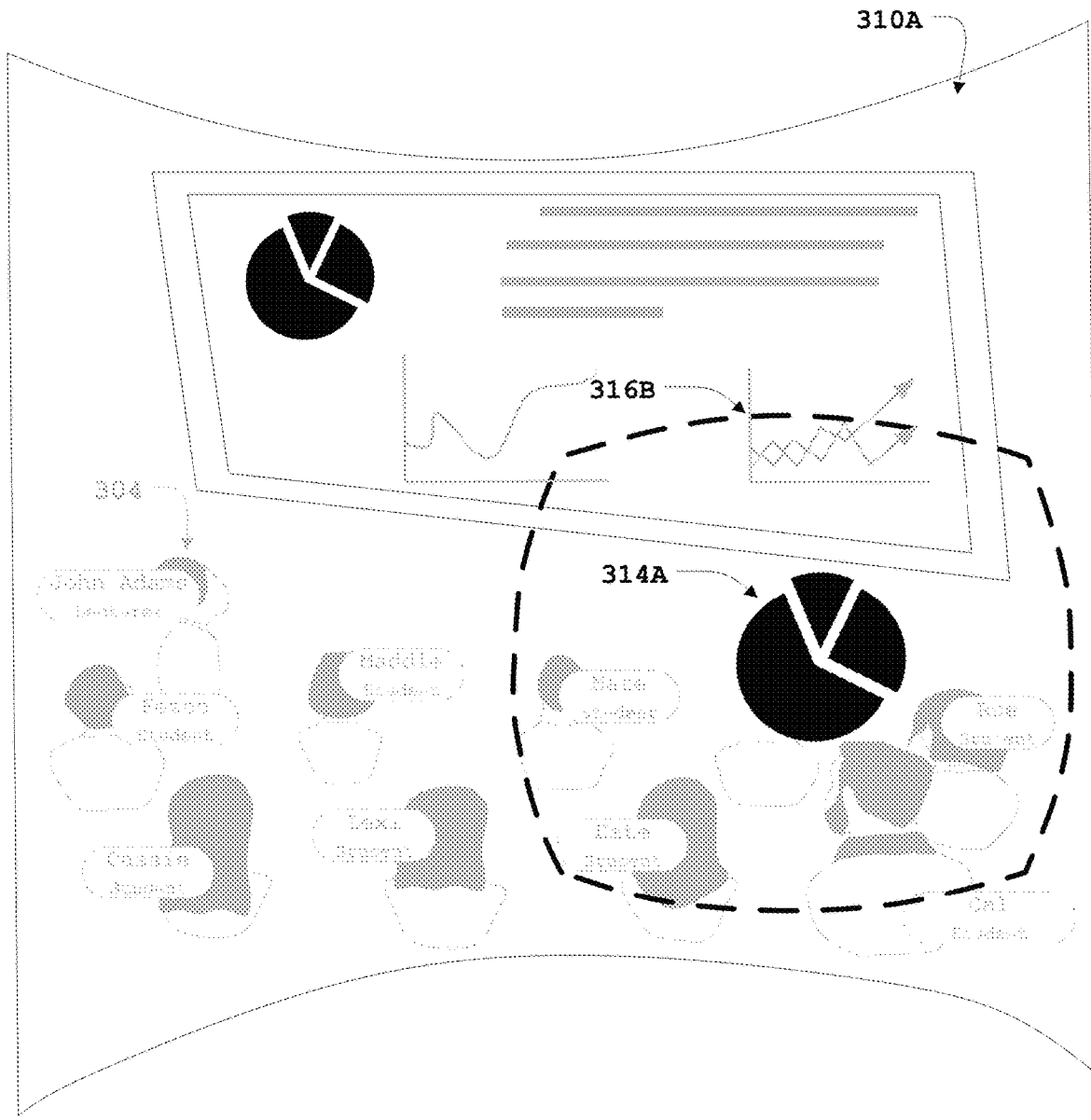
Figure 3F:
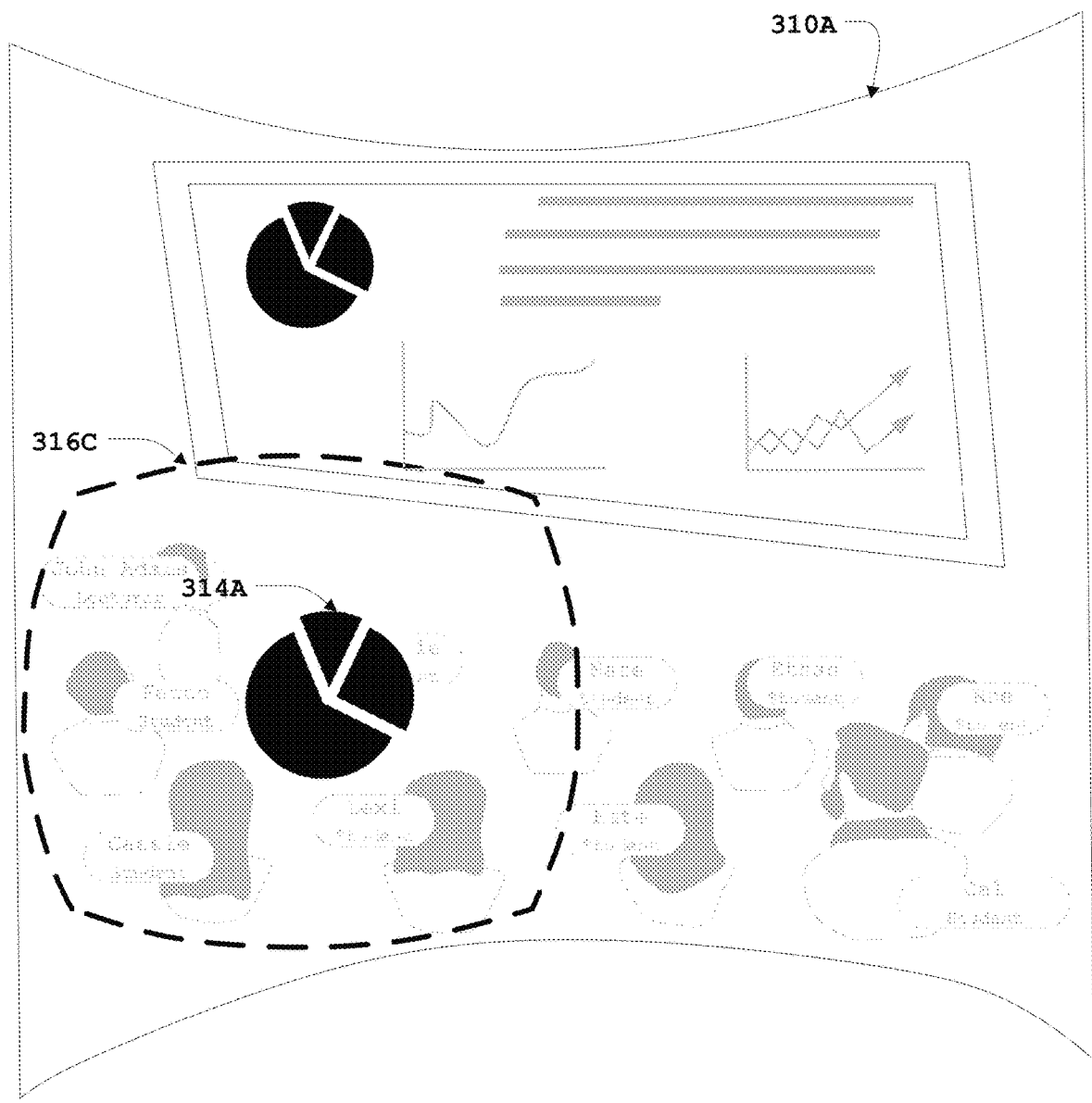
Figure 3G:
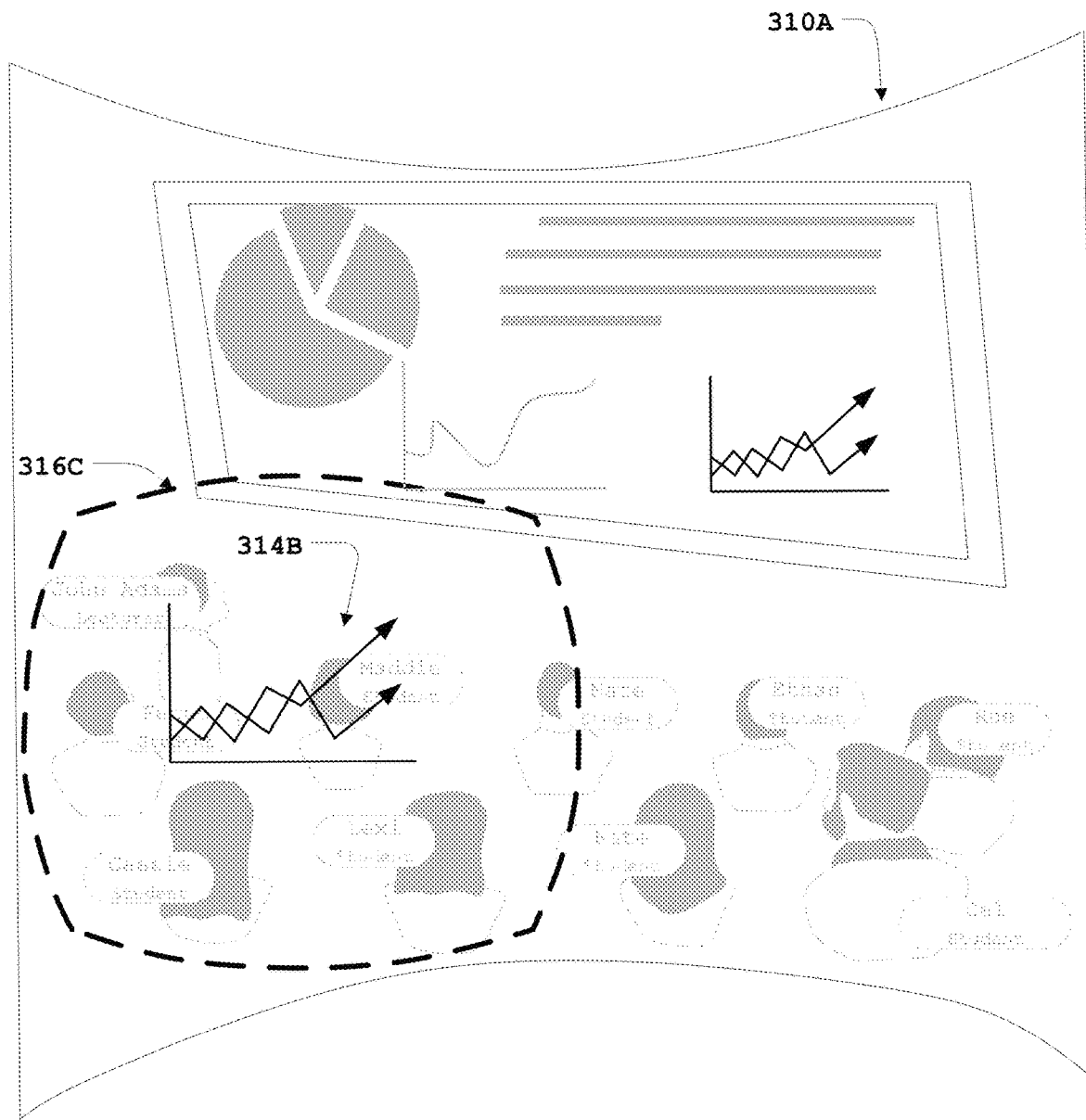

In the embodiment illustrated in FIGS. 3B-3G, a use case implementing the proposed processing unit 102 is shown. This use case is related to a virtual classroom scenario with a lecturer 312 (also referred to as the presenter 213) and students. The virtual classroom may be experienced by wearing a Head-Mounted Display (HMD) 308 as shown in FIG. 3B. Display 310A, as shown in FIGS. 3B and 3C, is the 360° view of one of the students in the virtual classroom. The 360° view includes plurality of objects 314A, 314B, 314C and 314D. Consider the presenter 312 selects the object 314A, as shown in FIG. 3D. The presenter input 212 from the presenter 312 indicating the selected object 314A may be received by the processing unit 102. The object 314A is dynamically fixed within viewpoint 316A of a student as shown in FIG. 3D. As shown in FIGS. 3E and 3F, when the viewpoint of the student changes to viewpoints 316B and 316C, at a different instance of time, the selected object 314A is dynamically fixed within the viewpoints 316B and 316C. The viewpoint of each of the students is thus monitored and the selected object may be dynamically fixed within the detected viewpoint. Consider a new object 314B is detected during the presentation by the presenter 312. The new object 314B may be detected based on the real-time preference 218 of the one or more students or the real-time context 216 identified during the presentation. In an embodiment, the new object 314B may be directly selected by the presenter 312. Upon detecting the new object 314B, existing viewpoint (consider the viewpoint 316C) is updated dynamically with the new object 314B, as shown in FIG. 3G.

In some non-limiting embodiments or aspects, the processing unit 102 may receive data for controlling the viewpoint via the I/O interface 114. The received data may include, but is not limited to, at least one of the presenter input data 212, viewpoint data 214, real-time context data 216, real-time preference data 218 and the like. Also, the processing unit 102 may transmit data for controlling the viewpoint via the I/O interface 114. The transmitted data may include, but is not limited to, one or more objects, new objects data 220 and the like.

The other data 222 may comprise data, including temporary data and temporary files, generated by modules for performing the various functions of the processing unit 102. The one or more modules 116 may also include other modules 210 to perform various miscellaneous functionalities of the processing unit 102. It will be appreciated that such modules may be represented as a single module or a combination of different modules.

Figure 4:
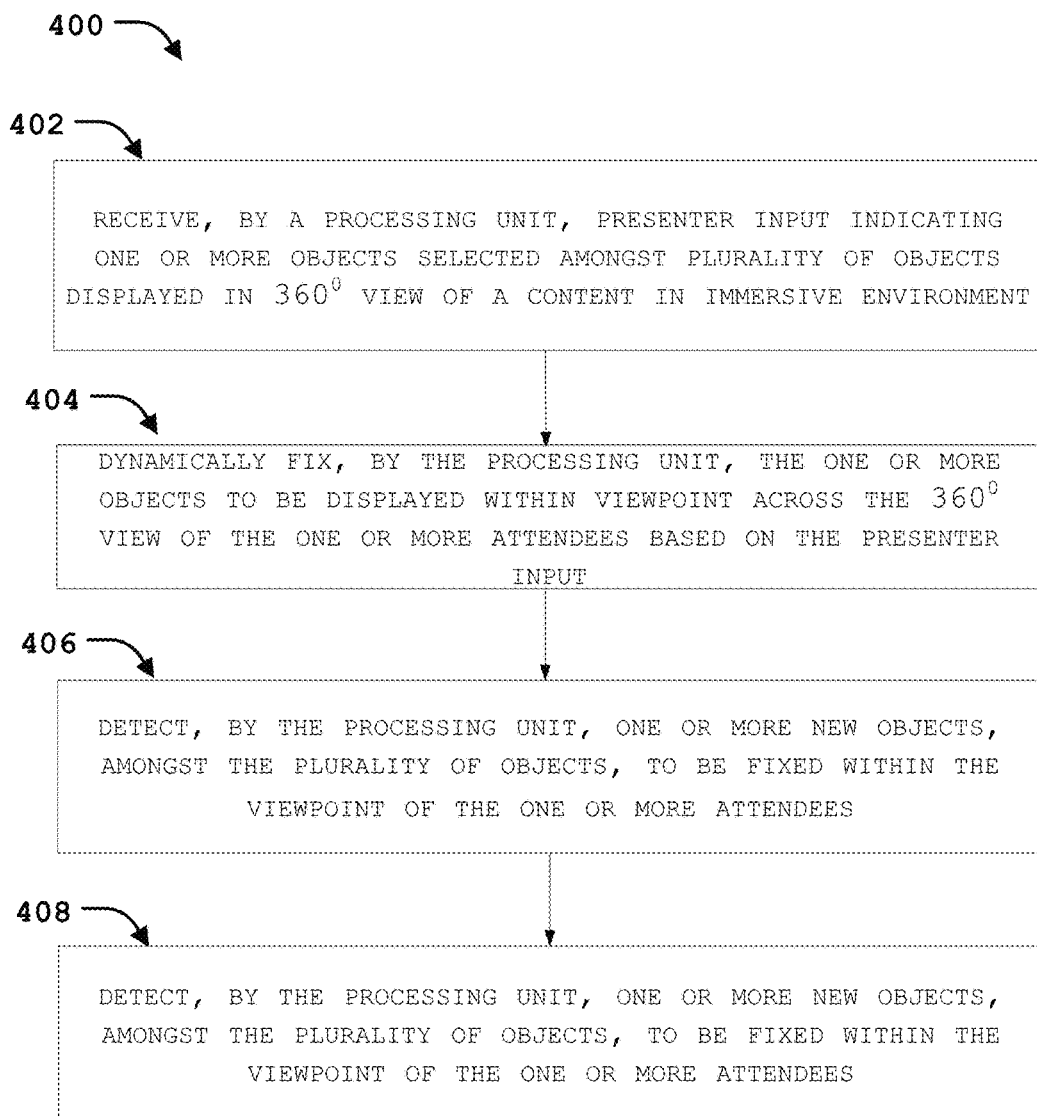
FIG. 4 is an exemplary process of processing unit for controlling viewpoint of one or more attendees in an immersive environment, in accordance with an embodiment of the present invention.

FIG. 4 shows an exemplary process of a processing unit 102 for controlling viewpoint of the one or more attendees in an immersive environment, in accordance with an embodiment of the present disclosure. Process 400 for controlling the viewpoint in the immersive environment includes steps coded in form of executable instructions to be executed by a processing unit associated with the immersive environment with the at least one presenter and the one or more attendees.

At block 402, the processing unit may be configured to receive presenter input indicating the one or more objects selected amongst the plurality of objects displayed in 360° view of a content in immersive environment with a presenter and one or more attendees. The one or more objects are selected by the presenter.

At block 404, the processing unit may be configured to dynamically fix the one or more objects to be displayed within viewpoint across the 360° view of the one or more attendees based on the presenter input. The one or more objects are dynamically fixed irrespective of inputs received from the one or more attendees to change objects within the viewpoint. In an embodiment, the one or more objects may be dynamically fixed within the viewpoint either by continuously rendering one of the one or more objects and the one or more new objects within the viewpoint or by adjusting display of the 360° view to fixedly present one of the one or more objects and the one or more new objects within the viewpoint.

At block 406, the processing unit may be configured to detect the one or more new objects, amongst the plurality of objects, to be fixed within the viewpoint of the one or more attendees, based on at least one of real-time preferences of the one or more attendees and real-time context of the content provided by the presenter. In an embodiment, the one or more new objects are detected by monitoring user actions of the one or more attendees during rendering of the content in the immersive environment, identifying the real-time preference of the one or more attendees with respect to objects displayed in the 360° view, using the user actions, and detecting the one or more new objects using the real-time preferences of the one or more attendees. In an embodiment, the user actions may include, but are limited to, at least one of eyeball movement, head movement, gesture, display controller input, voice input and screen input of the one or more attendees.

In another embodiment, the one or more new objects may be detected by identifying the real-time context of the content provided by the presenter by analyzing the content and detecting the one or more new objects using the real-time context.

At block 408, the processing unit may be configured to dynamically re-fix the one or more new objects to be displayed within the viewpoint of the one or more attendees. In an embodiment, the one or more new objects may be dynamically re-fixed within the viewpoint either by continuously rendering one of the one or more objects and the one or more new objects within the viewpoint or by adjusting display of the 360° view to fixedly present one of the one or more objects and the one or more new objects within the viewpoint. In an embodiment, the processing unit may be further configured to provide a recommendation generated based on at least one of the real-time preferences and the real-time context, to the presenter for modifying the one or more selected objects to be the one or more new objects. When the presenter input indicating the one or more new objects selected by the presenter is received in response to the recommendation, the one or more new objects to be displayed within the viewpoint are dynamically re-fixed based on the presenter input.

As illustrated in FIG. 4, the method 400 may include one or more steps for executing processes in the processing unit 102. The method 400 may be described in the general context of computer executable instructions. Generally, computer executable instructions can include routines, programs, objects, components, data structures, procedures, modules, and functions, which perform particular functions or implement particular abstract data types.

The order in which steps in the method 400 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Figure 5:
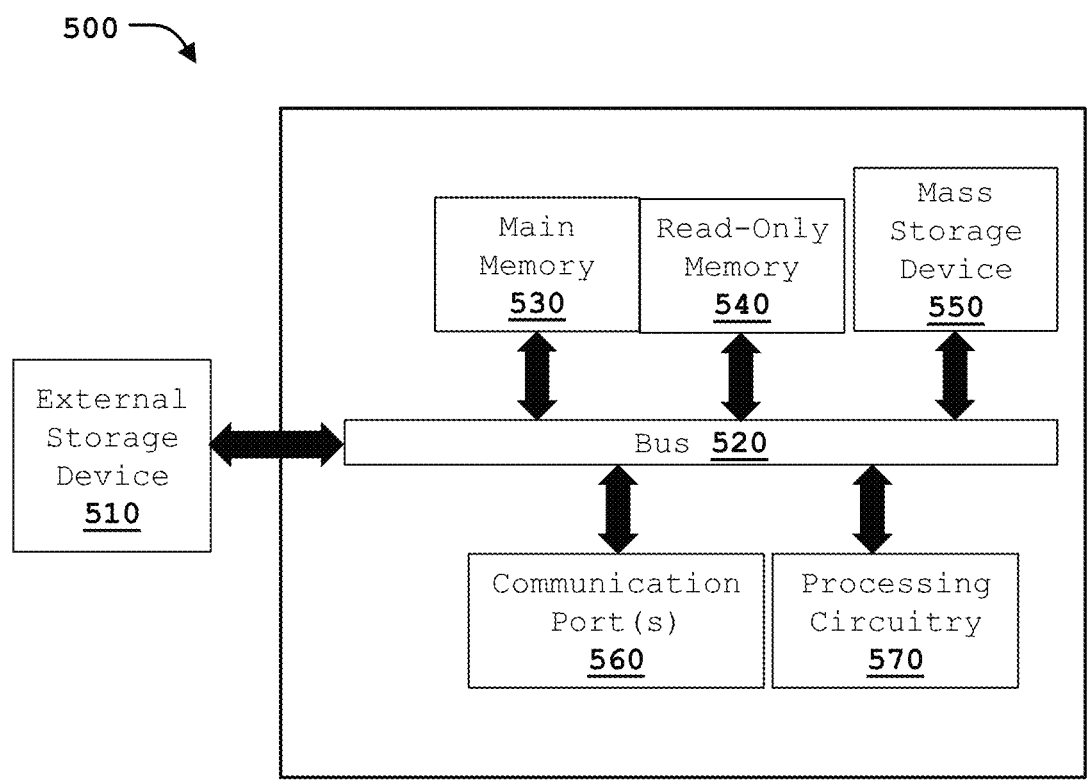
FIG. 5 illustrates an exemplary computer unit in which or with which embodiments of the present invention may be utilized.

FIG. 5 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 5, the computer system 500 includes an external storage device 510, bus 520, main memory 530, read-only memory 540, mass storage device 550, communication port(s) 560, and processing circuitry 570.

Those skilled in the art will appreciate that the computer system 500 may include more than one processing circuitry 570 and one or more communication ports 560. The processing circuitry 570 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 570 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 570 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 570 may include various modules associated with embodiments of the present disclosure.

The communication port 560 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 560 may be any RS-232 port for use with a modem-based dialup connection, a 10/100 Ethernet port, a Gigabit, or a 10 Gigabit port using copper or fiber, a serial port, a parallel port, or other existing or future ports. The communication port 560 may be chosen depending on a network, such as a Local Area Network (LAN), Wide Area Network (WAN), or any network to which the computer system 500 may be connected.

The main memory 530 may include Random Access Memory (RAM) or any other dynamic storage device commonly known in the art. Read-only memory (ROM) 540 may be any static storage device(s), e.g., but not limited to, a Programmable Read-Only Memory (PROM) chips for storing static information, e.g., start-up or BIOS instructions for the processing circuitry 570.

The mass storage device 550 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 530. The mass storage device 550 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 520 communicatively couples the processing circuitry 570 with the other memory, storage, and communication blocks. The bus 520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 570 to the software system.

Optionally, operator and administrative interfaces, e.g., a display, keyboard, and a cursor control device, may also be coupled to the bus 520 to support direct operator interaction with the computer system 500. Other operator and administrative interfaces may be provided through network connections connected through the communication port(s) 560. The external storage device 510 may be any kind of external hard drives, floppy drives, IOMEGA® Zip Drives, Compact Disc—Read-Only Memory (CD-ROM), Compact Disc Re-Writable (CD-RW), Digital Video Disk—Read Only Memory (DVD-ROM). The components described above are meant only to exemplify various possibilities. In no way should the aforementioned exemplary computer system limit the scope of the present disclosure.

The computer system 500 may be accessed through a user interface. The user interface application may be implemented using any suitable architecture. For example, it may be a stand-alone application wholly implemented on the computer system 500. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 500 is retrieved on-demand by issuing requests to a server remote to the computer system 500. For example, computer system 500 may receive inputs from the user via an input interface and transmit those inputs to the remote server for processing and generating the corresponding outputs. The generated output is then transmitted to the computer system 500 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

We claim:

1. A method for controlling viewpoint of one or more attendees in an immersive environment, the method comprising:
   receiving, by a processing unit, presenter input indicating one or more objects selected amongst plurality of objects displayed in 360° view of a content in immersive environment comprising a presenter and one or more attendees, wherein the one or more objects are selected by the presenter;
   dynamically fixing, by the processing unit, the one or more objects to be displayed within viewpoint across the 360° view of the one or more attendees based on the presenter input, irrespective of inputs received from the one or more attendees to change objects within the viewpoint;
   detecting, by the processing unit, one or more new objects, amongst the plurality of objects, to be fixed within the viewpoint of the one or more attendees, based on at least one of real-time preferences of the one or more attendees and real-time context of the content provided by the presenter; and
   dynamically re-fixing, by the processing unit, the one or more new objects to be displayed within the viewpoint of the one or more attendees;
   wherein dynamically re-fixing the one or more new objects to be displayed within the viewpoint comprises:
      providing, by the processing unit, a recommendation generated based on at least one of the real-time preferences and the real-time context, to the presenter for modifying the one or more selected objects to be the one or more new objects;
      receiving, by the processing unit, the presenter input indicating the one or more new objects selected by the presenter in response to the recommendation; and
      dynamically re-fixing, by the processing unit, the one or more new objects to be displayed within the viewpoint based on the presenter input.

2. The method as claimed in claim 1, wherein detecting the one or more new objects comprises:
   monitoring, by the processing unit, user actions of the one or more attendees during rendering of the content in the immersive environment;
   identifying, by the processing unit, the real-time preference of the one or more attendees with respect to objects displayed in the 360° view, using the user actions; and
   detecting, by the processing unit, the one or more new objects using the real-time preferences of the one or more attendees.

3. The method as claimed in claim 2, wherein the user actions comprise at least one of eyeball movement, head movement, gesture, display controller input, voice input and screen input of the one or more attendees.

4. The method as claimed in claim 1, wherein detecting the one or more new objects comprises:
   identifying, by the processing unit, the real-time context of the content provided by the presenter by analyzing the content; and
   detecting, by the processing unit, the one or more new objects using the real-time context.

5. The method as claimed in claim 1, wherein each of the one or more objects and the one or more new objects are one of static objects and dynamic objects.

6. The method as claimed in claim 1, wherein dynamically fixing the one or more objects and dynamically re-fixing the one or more new objects comprises one of:
   continuously rendering one of the one or more objects and the one or more new objects within the viewpoint; and
   adjusting display of the 360° view to fixedly present one of the one or more objects and the one or more new objects within the viewpoint.

7. A processing unit for controlling viewpoint of one or more attendees in an immersive environment, the processing unit comprises:
   one or more processors; and
   a memory communicatively coupled to the one or more processors, wherein the memory stores processor-executable instructions, which, on execution, cause the one or more processors to:
      receive presenter input indicating one or more objects selected amongst plurality of objects displayed in 360° view of a content in immersive environment comprising a presenter and one or more attendees, wherein the one or more objects are selected by the presenter;
      dynamically fix the one or more objects to be displayed within viewpoint across the 360° view of the one or more attendees based on the presenter input, irrespective of inputs received from the one or more attendees to change objects within the viewpoint;
      detect one or more new objects, amongst the plurality of objects, to be fixed within the viewpoint of the one or more attendees, based on at least one of real-time preferences of the one or more attendees and real-time context of the content provided by the presenter; and
      dynamically re-fix the one or more new objects to be displayed within the viewpoint of the one or more attendees;
   wherein the one or more processors are configured to dynamically re-fix the one or more new objects to be displayed within the viewpoint by:
      providing a recommendation generated based on at least one of the real-time preferences and the real-time context, to the presenter for modifying the one or more selected objects to be the one or more new objects;

receiving the presenter input indicating the one or more new objects selected by the presenter in response to the recommendation; and dynamically re-fixing the one or more new objects to be displayed within the viewpoint based on the presenter input.

8. The processing unit as claimed in claim 7, wherein the one or more processors are configured to detect the one or more new objects by:

monitoring user actions of the one or more attendees during rendering of the content in the immersive environment;

identifying, by the processing unit, the real-time preference of the one or more attendees with respect to objects displayed in the 360° view, using the user actions; and detecting the one or more new objects using the real-time preferences of the one or more attendees.

9. The processing unit as claimed in claim 8, wherein the user actions comprise at least one of eyeball movement, head movement, gesture, display controller input, voice input and screen input of the one or more attendees.

10. The processing unit as claimed in claim 7, wherein the one or more processors are configured to detect the one or more new objects by:

identifying the real-time context of the content provided by the presenter by analyzing the content; and detecting the one or more new objects using the real-time context.

11. The processing unit as claimed in claim 7, wherein each of the one or more objects and the one or more new objects are one of static objects and dynamic objects.

12. The processing unit as claimed in claim 7, wherein the one or more processors are configured to dynamically fix the one or more objects and dynamically re-fix the one or more new objects by one of:

continuously rendering one of the one or more objects and the one or more new objects within the viewpoint; and adjusting display of the 360° view to fixedly present one of the one or more objects and the one or more new objects within the viewpoint.

13. A non-transitory computer-readable medium including instructions stored thereon that when processed by one or more processors cause a system to perform operations comprising:

receiving presenter input indicating one or more objects selected amongst plurality of objects displayed in 360° view of a content in immersive environment comprising a presenter and one or more attendees, wherein the one or more objects are selected by the presenter;

dynamically fixing the one or more objects to be displayed within viewpoint across the 360° view of the one or more attendees based on the presenter input, irrespective of inputs received from the one or more attendees to change objects within the viewpoint;

detecting one or more new objects, amongst the plurality of objects, to be fixed within the viewpoint of the one or more attendees, based on at least one of real-time preferences of the one or more attendees and real-time context of the content provided by the presenter; and dynamically re-fixing the one or more new objects to be displayed within the viewpoint of the one or more attendees;

wherein dynamically re-fixing the one or more new objects to be displayed within the viewpoint comprises:

providing, by the processing unit, a recommendation generated based on at least one of the real-time preferences and the real-time context, to the presenter for modifying the one or more selected objects to be the one or more new objects;

receiving, by the processing unit, the presenter input indicating the one or more new objects selected by the presenter in response to the recommendation; and dynamically re-fixing, by the processing unit, the one or more new objects to be displayed within the viewpoint based on the presenter input.

14. The medium as claimed in claim 13, wherein detecting the one or more new objects comprises:

monitoring user actions of the one or more attendees during rendering of the content in the immersive environment;

identifying the real-time preference of the one or more attendees with respect to objects displayed in the 360° view, using the user actions; and detecting the one or more new objects using the real-time preferences of the one or more attendees, wherein the user actions comprise at least one of eyeball movement, head movement, gesture, display controller input, voice input and screen input of the one or more attendees.

15. The medium as claimed in claim 13, wherein detecting the one or more new objects comprises:

identifying, by the processing unit, the real-time context of the content provided by the presenter by analyzing the content; and detecting, by the processing unit, the one or more new objects using the real-time context.

16. The medium as claimed in claim 13, wherein each of the one or more objects and the one or more new objects are one of static objects and dynamic objects.

17. The medium as claimed in claim 13, wherein dynamically fixing the one or more objects and dynamically re-fixing the one or more new objects comprises one of:

continuously rendering one of the one or more objects and the one or more new objects within the viewpoint; and adjusting display of the 360° view to fixedly present one of the one or more objects and the one or more new objects within the viewpoint.

* * * * *